A. F. KLASING.
BRAKE APPARATUS.
APPLICATION FILED MAY 6, 1919.
1,348,282.
Patented Aug. 3, 1920.
2 SHEETS—SHEET 2.
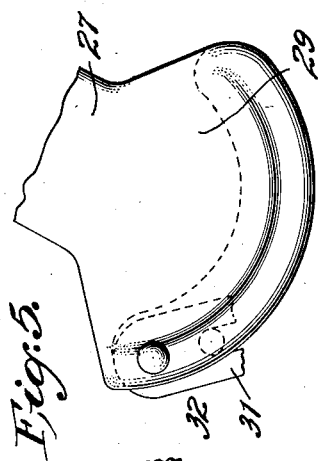
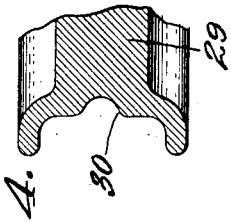
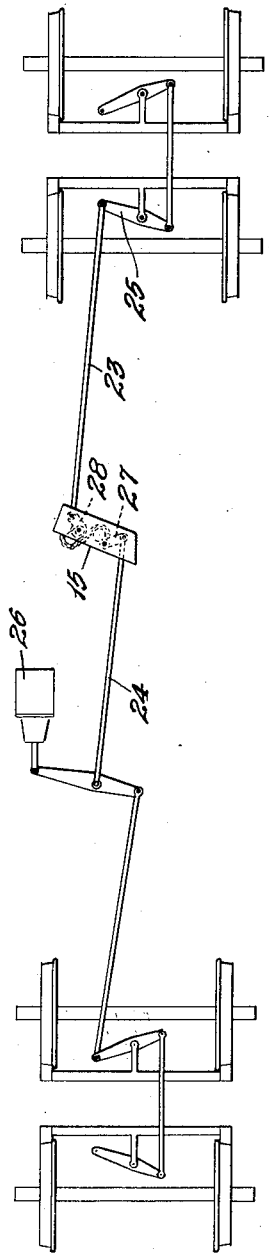
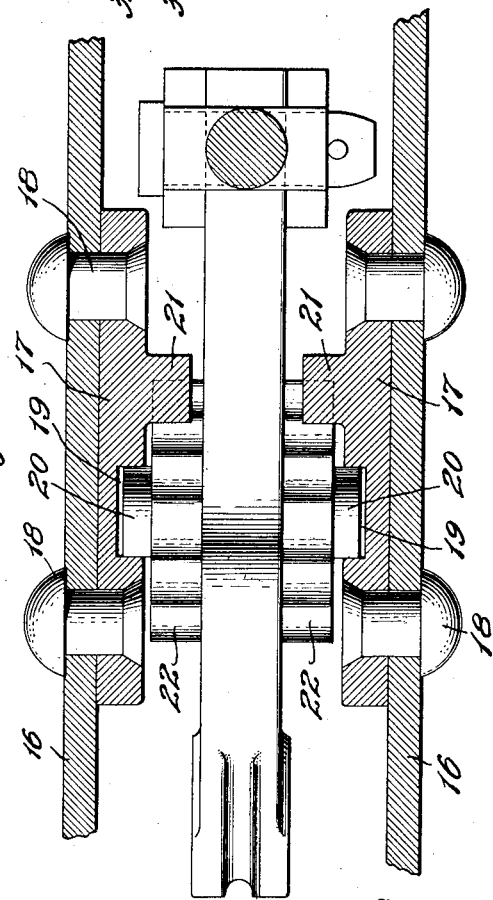

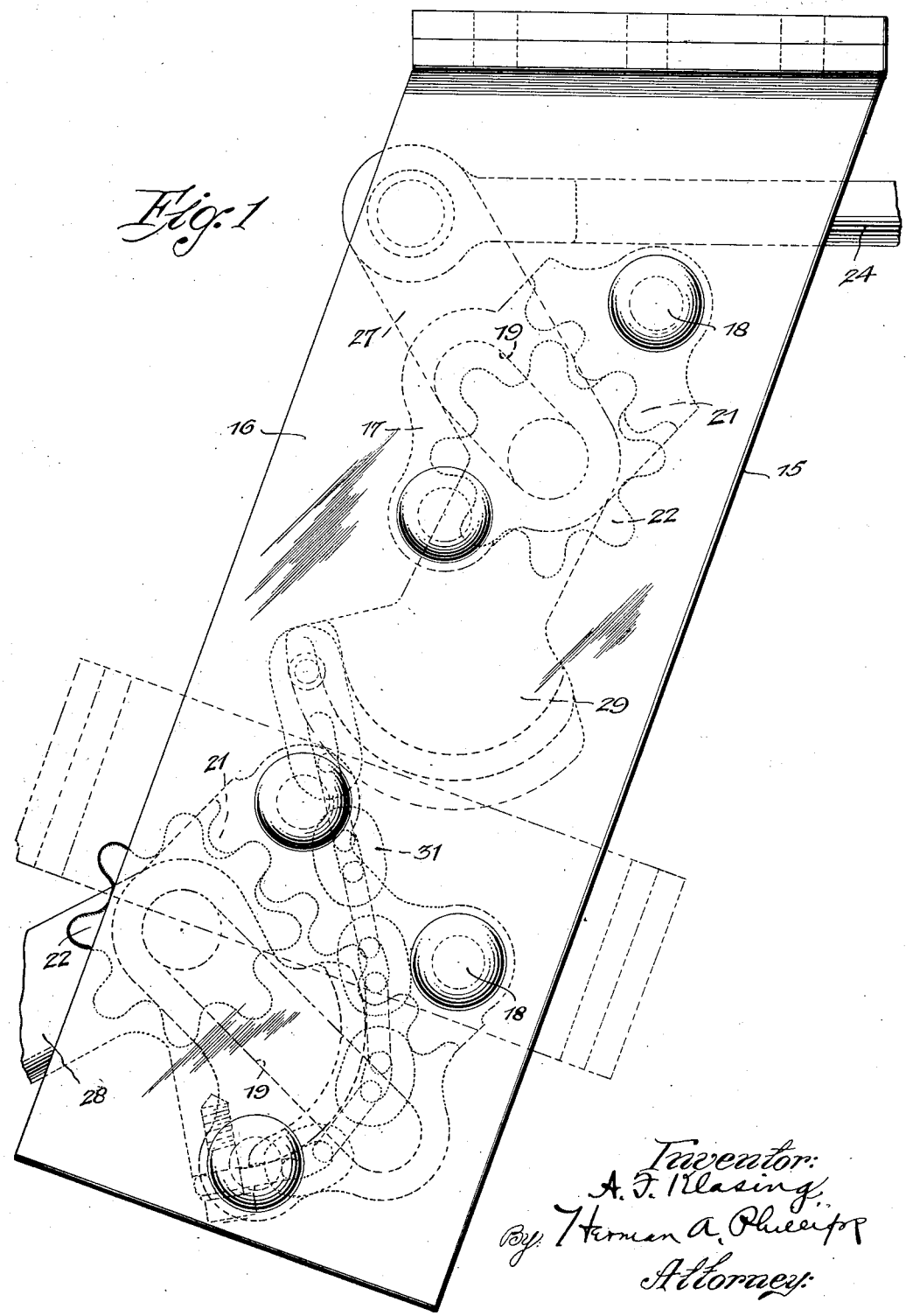

UNITED STATES PATENT OFFICE.

AUGUSTUS F. KLASING, OF CHICAGO, ILLINOIS, ASSIGNOR OF ONE-HALF TO FREDERICK J. STOLPE, OF CHICAGO, ILLINOIS.

BRAKE APPARATUS.

1,348,282.     Specification of Letters Patent.     Patented Aug. 3, 1920.

Application filed May 6, 1919. Serial No. 295,169.

*To all whom it may concern:*

Be it known that I, AUGUSTUS F. KLASING, a citizen of the United States, residing at Chicago, in the county of Cook and State of Illinois, have invented certain new and useful Improvements in Brake Apparatus, of which the following is a specification.

My present invention relates to movement multiplying or amplifying means and more particularly to leverage devices, my primary object being the provision of a strong, compact and durable arrangement of this nature especially applicable to car brakes.

Considered more specifically, my invention aims to provide simple, readily attachable means for use in connection with car brakes, whereby to increase the length of stroke, or extent of movement, of the connection, at a point intermediate the source of power and the point of application.

Taking the brake lever at the truck as the point of application, and the brake cylinder as the source of power, my invention contemplates the interposition of an arrangement between these parts, of a simple, effective nature, whose function is to multiply or augment the length of stroke as imparted from the piston of the brake cylinder to the brake lever.

In order to accomplish the desired result one obviously requires means capable of augmentation of movement between parts movable in the same direction and shiftable in approximately rectilinear movement. These requirements I propose to meet in a device capable of ready, quick installation, as hereinafter described in connection with the accompanying drawings, forming a part of this specification, and wherein:

Figure 1 is a side elevation of my improved device,

Fig. 2 is a diagram illustrating application of the device within air brake connections, Fig. 3 is a sectional view through my improved device, Fig. 4 is a detail section through a portion of the segmental end of one of the levers, and Fig. 5 is a side view of one of the segmental ends of the lever.

Referring now to these figures, and particularly to Figs. 1 and 3, my invention proposes an arrangement including a support generally indicated at 15 and preferably consisting of spaced parallel side plates 16, suitably connected either at one or both ends and preferably in such manner as to permit of convenient securing of the support to a car body or other structure.

Secured within the support at spaced points are opposing fulcrum plates 17, each of these plates of the two pairs being secured to the side plates 16 of the support by rivets or other fastening members 18 and having upon their inner faces lengthwise slotted openings 19 arranged to receive the laterally projecting trunnions or fulcrum pins 20 of a lever, the fulcrum plates of each pair being further provided with opposing toothed ribs 21 arranged to receive the teeth of toothed members 22 at opposite sides of the lever just above referred to and either secured thereto or formed integral therewith.

It will be noted by reference to the dotted lines in Fig. 1 that the series of teeth of each of the ribs 21 extend parallel to the respective fulcrum slots 19, and that the support as thus described, with its rigid fulcrum-forming means, is capable of ready, convenient connection to the lower portion of a car body or to any other member adjacent to which it is intended to be utilized.

As seen in Fig. 2, the support may be secured to extend horizontally between connecting rods 23 and 24 respectively leading through intermediate connections to the brake or truck lever 25 and the brake cylinder 26 of an air brake apparatus. These connecting rods 23 and 24 having rectilinear or approximately rectilinear movement, requires that the means within the support 15 for the purpose of transmitting to the connecting rod 23 a stroke of greater length than that imparted by the connecting rod 24, be adaptable to these movements, and for this purpose my invention proposes a pair of bodily shiftable levers 27 and 28, each connected at one end to one of the connecting rods 23, 24, for instance, lever 27 being connected at its outer end to connecting rod 24 and lever 28 similarly connected at its outer end to the connecting rod 23. These connections between the levers and connecting rods are of course of a pivotal nature and, while having approximately rectilinear movement, the connecting rods 23 and 24 are of course yieldable to some extent. The relatively opposite or inner ends of the levers 27 and 28 are each flared to the segmental form indicated more particularly at 29 in Fig. 5, each segmental end 29 having a peripheral groove 30 as seen in Fig. 4, forming a guide for a flexible connection in the nature of a chain 31, one end of which is secured by means of a transverse pin 32, to one end of the segmental end of lever 27, while the opposite end of the chain is similarly connected to the relatively opposite side of the inner segmental end of lever 28.

Each of the levers 27, 28, in the form of a bell crank, as previously described, has at its fulcrum point the fulcrum pin 20 before referred to, as well as the side toothed members 22, disposed respectively in the slots 19 and against the toothed ribs 21 of its respective fulcrum plates 17 carried by the supports 15, so that it is obvious that when the lever 28 is rocked, the bearing of its toothed member 22 against the fulcrum plate ribs 21, forces the shifting of its fulcrum in the fulcrum slots 19. In this way both the rocking movements of the lever, plus its shifting movement, is communicated through the connecting chain 31 to the lever 28, forcing rocking movement of the lever in the relatively opposite direction, and the simultaneous shifting of the fulcrum thereof so as to augment or increase the stroke, through these connecting parts, from what might be said to be a relatively short movement of the connecting rod 24 to a relatively lengthy movement of the connecting rod 23.

It is to be observed from the foregoing that my improvements thus lend themselves with especial facility to installation in connection with car brakes, both air brakes and hand brakes, and that my improvements are simple, economical, and durable, and are capable of ready, quick installation and effective operation for the intended purposes.

I claim:—

1. The combination with tension members to be connected having approximately rectilinear movement, of a support having a pair of parallel side plates, a pair of bell cranks in the support, having laterally projecting fulcrum pins and provided with side toothed members around their said fulcrum pins, fulcrum plates secured in opposing pairs to the inner surfaces of the said side plates of the support, and each provided with a slotted opening and a toothed rib parallel to the opening, to respectively receive the fulcrum pins and toothed members of the said bell cranks, each of said bell cranks being connected at its outer end to one of the said tension members, and having its inner end flared to form a segmental extremity provided with a peripheral guide, and a flexible connection secured at one end to one side of the segmental extremity of one of the levers and at its opposite end to the relatively opposite side of the segmental end of the other of said levers, said flexible connection being movable in the guide grooves of the segmental end, as described.

2. The combination with tension members to be connected having approximately rectilinear movement, of a support including parallel side plates having inner spaced pairs of fulcrum plates the plates of each pair being mounted in opposing relation and provided with slotted openings and with toothed ribs parallel to the openings, a pair of bell-crank levers each pivotally connected at one end to one of the said tension members, each of said levers having laterally projecting pins at its fulcrum point movable in the said slots of the fulcrum plates and also provided with toothed gear members around the said pins, engaging the toothed ribs of the fulcrum plates, the opposite adjacent ends of the bell cranks being flared in the segmental form, and a flexible connection secured at one end to one side of the segmental end of one of said levers and secured at its opposite end to the relatively opposite side of the segmental end of the other lever.

3. The combination with tension members to be connected, having approximately rectilinear movement, of a pair of bell cranks, each connected at one end to one of said members, a support in which each of said bell crank levers has a shiftable fulcrum, relatively engaging toothed elements carried by the bell cranks and the said support for shifting the fulcrums of the bell cranks when the latter are rocked, and a flexible connection between opposite ends of the said bell cranks arranged to move one in a direction opposite to that of the other.

4. The combination with tension members to be connected, having approximately rectilinear movement, of a pair of bell cranks, each connected to one of said members, a support in which each of said bell cranks has a shiftable fulcrum, coöperating means carried by the bell cranks and the said support for shifting the fulcrums of the former upon pivotal movement thereof, and a flexible connection between said levers, for the purpose described.

5. The combination with tension members to be connected having approximately rectilinear movement, of a pair of bell cranks connected to one another and respectively pivoted to said members, a support therefor, means forming shiftable fulcrums for said bell cranks in the support, and means for shifting the fulcrums of the bell cranks in relatively opposite directions upon pivotal movement thereof.

6. In a device of the character described, a support, bodily movable bell-cranks having shiftable fulcrums in the support, means for shifting said bell-cranks bodily during movement on their fulcrums, and connections between said levers arranged to shift one of the levers in a direction relatively opposite to the shifting movement of the other lever.

7. In a device of the character described, a support, a pair of bell-cranks connected to one another and movable in relatively opposite directions, means forming shiftable fulcrums for the said bell-cranks in the support, and means whereby to shift the fulcrums of said bell-cranks upon pivotal movement thereof.

In testimony whereof I affix my signature.

AUGUSTUS F. KLASING.